United States Patent [19]
Chen

[11] Patent Number: 5,391,014
[45] Date of Patent: Feb. 21, 1995

[54] UNIVERSALLY ROTATABLE NIPPLE FOR A BRAKE CABLE

[75] Inventor: Chao F. Chen, Taichung Hsien,

[73] Assignee: Kalloy Industrial Co., Ltd., Taichung Hsien,

[21] Appl. No.: 98,848

[22] Filed: Sep. 14, 1993

[51] Int. Cl.⁶ .............................................. F16C 1/14
[52] U.S. Cl. ........................................ 403/74; 403/252; 285/261; 188/2 D
[58] Field of Search ................. 403/57, 74, 72, 76, 403/122, 247, 252, 326; 285/160, 184, 261; 188/2 D

[56] References Cited

U.S. PATENT DOCUMENTS

| | | | |
|---|---|---|---|
| 2,476,850 | 7/1949 | Fiori et al. | 403/57 |
| 4,887,482 | 12/1989 | Romano | 188/2 D X |
| 4,946,202 | 8/1990 | Perricone | 285/184 |
| 5,303,136 | 4/1994 | Brown | 403/76 |

FOREIGN PATENT DOCUMENTS 2227463 11/1974 France .................. 403/122

Primary Examiner—Edward K. Look
Assistant Examiner—Michael S. Lee
Attorney, Agent, or Firm—Rogers, Howell & Haferkamp

[57] ABSTRACT

A universally rotatable nipple for a brake cable includes a socket device having a hemispherical body and a first tube extending from a periphery portion of the hemispherical body and a rotatable device including a sphere and a second tube extending from a periphery portion of the sphere. The sphere of the rotatable device is rotatably received in the hemispherical body of the socket device with the second tube being in communication with the first tube, thus allowing a brake cable to be guided from the second tube through the first tube. The rotatable nipple responds to the pulling from the brake cable and rotates in an appropriate direction to release the friction between the nipple and the brake cable.

2 Claims, 3 Drawing Sheets

UNIVERSALLY ROTATABLE NIPPLE FOR A BRAKE CABLE

FIELD OF THE INVENTION

This invention relates to a universally rotatable nipple for a brake cable especially one which is freely rotatable in response to the pulling movement of the brake cable thus preventing unwanted friction therebetween.

BACKGROUND OF THE INVENTION

The conventional brake cable bracket assembly usually has a bracket secured to the head tube of a bicycle and a nipple fixed on the bracket. A brake cable is guided through the nipple to thereby pull a brake. However, the brake cable easily incurs sharp friction with the nipple at a bottom periphery thereof thus causing unnecessary resistance and decreasing the braking effect. In addition, the brake cable is apt to suffer a problem of being worn out and cause danger for long term use. It is requisite to provide a new nipple which is rotatable in response to the pulling of the brake cable thus preventing the sharp friction between the brake cable and the nipple.

SUMMARY OF THE INVENTION

It is an object of the present invention to provide a universally rotatable nipple for a brake cable, thus preventing unwanted friction between the nipple and the brake cable when the latter is pulled up and down through the nipple.

This and additional objects, if not set forth specifically herein, will be readily apparent to those skilled in the art from the detailed description provided hereunder, with appropriate reference to the accompanying drawings.

DETAILED DESCRIPTION OF THE PREFERRED EMBODIMENTS

Figure 6:
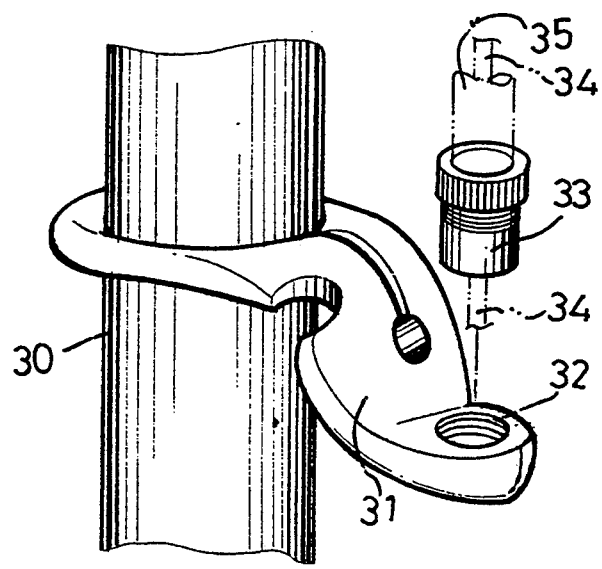
FIG. 6 illustrates a conventional nipple fixed on a bracket which is further fixed on a head tube of a bicycle.

For better understanding, a conventional nipple is illustrated as an example for reference. Referring to FIG. 6, a conventional brake cable bracket assembly comprises a bracket 31 and a rigid nipple 33. The bracket 31 is fixed on a head tube 30 of a bicycle. A brake cable having an inner cable 34 enclosed by a sheath 35 is fixed in the non-rotatable nipple 33, with a portion of the inner cable 34 extending downward through the rigid nipple 33 and further connected to a brake (not shown). The non-rotatable nipple 33 is firmly located in a hole 32 of the bracket 31.

Figure 1:
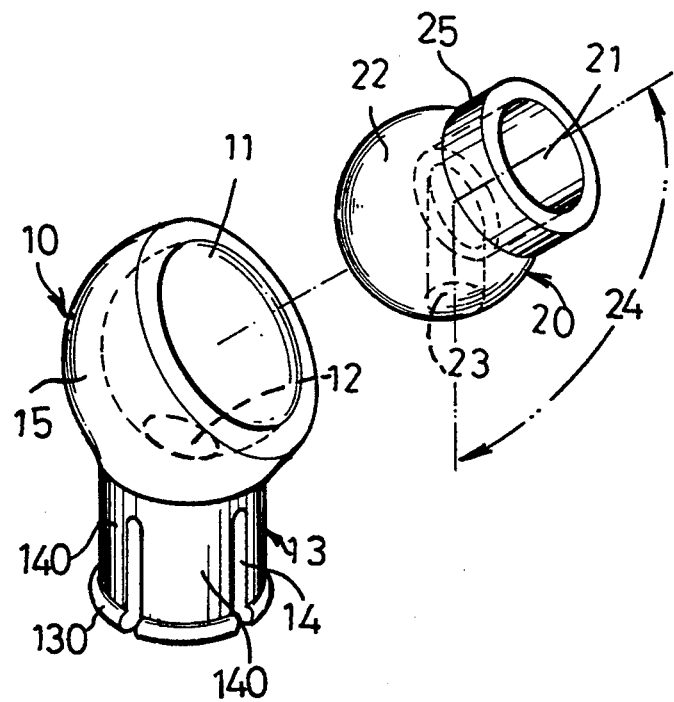
FIG. 1 is an exploded view of a universal rotatable nipple for a brake cable in accordance with the present invention.

Referring to FIG. 1, a universally rotatable nipple for a brake cable comprises a socket means 10 and a rotatable means 20. The socket means 10 has a substantially hemispherical body 15 and a first tube 13 extending from a periphery portion of the hemispherical body 15. A substantially hemispherical cavity 11 is formed in the hemispherical body 15. The hemispherical cavity 11 is in communication with an inner space of the first tube 13 by a first hole 12. A plurality of slots 14 are formed in the periphery of the tube 13 from an end portion of the tube 13 to nearly the intersection of the hemispherical body 15 and the tube 13, thus defining a plurality of flexible plates 140 therebetween. The rotatable means 20 has a sphere 22 which has a second tube 25 extending from a periphery portion thereof. The second tube 25 has a first passage 21 therein which is further extended inward to a center of the sphere 22. The sphere 22 has a second passage 23 internally formed therein which is in communication with the first passage 21. An obtuse angle 24 substantially equal to 120° is formed between a first axis of the first passage 21 and a second axis of the second passage 23 in respective longitudinal directions thereof.

Figure 2:
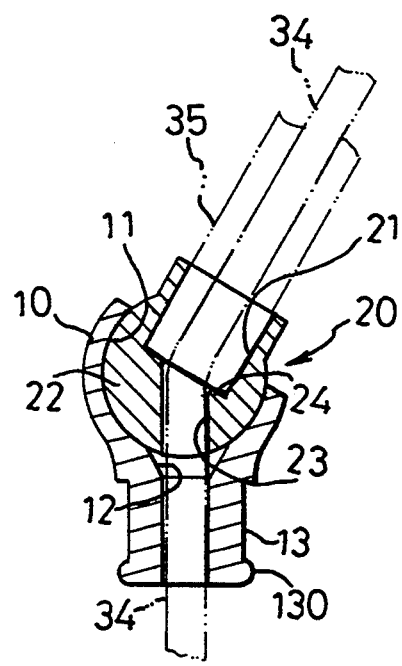
FIG. 2 is an assembled sectional view of FIG. 1.
Figure 3:
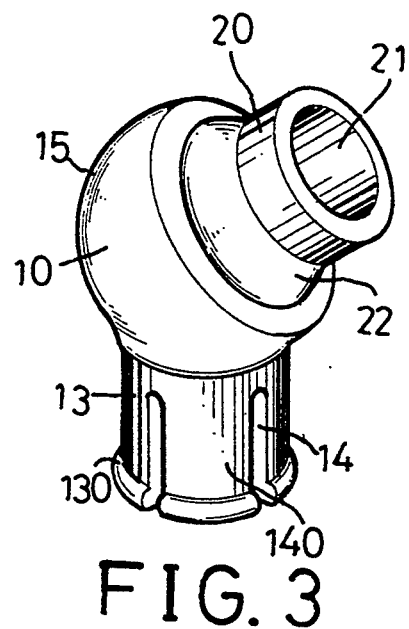
FIG. 3 is an assembled view of FIG. 1.

Referring to FIGS. 2 and 3, the rotatable means 20 is rotatably received in the hemispherical cavity 11 of the hemispherical body 15 with the second passage 23 being in communication with the first tube 13 via the first hole 12.

Particularly referring to FIG. 2, the rotatable means 20 is rotatably received in the socket means 10 with a conventional brake cable (34 and 35) located therethrough. The conventional brake cable, the same as that shown in FIG. 6, is located inside the rotatable means 20 with the sheath 35 thereof being fitted inside the first passage 21 thereof while the inner cable 34 thereof being slidably guided through the second passage 23, the first hole 12 of the hemispherical body 15, and the first tube 13, and connected to the brake (not shown).

Figure 4:
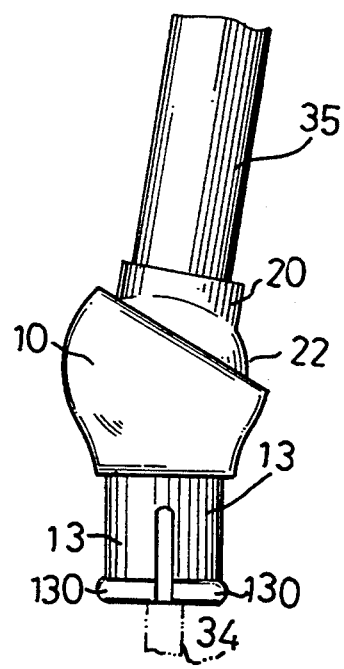
FIG. 4 illustrates the universal rotatable nipple operated in a different direction compared to that of FIG. 3.

FIG. 4 illustrates the rotatable means 20 being pulled by the brake cable in relation to that in FIG. 2 illustrating that the rotatable means 20 is rotatable in relation to the socket means 10. The rotatable nipple of the present invention responds to the pulling from the brake cable and rotates in an appropriate direction to release the friction therebetween.

Figure 5:
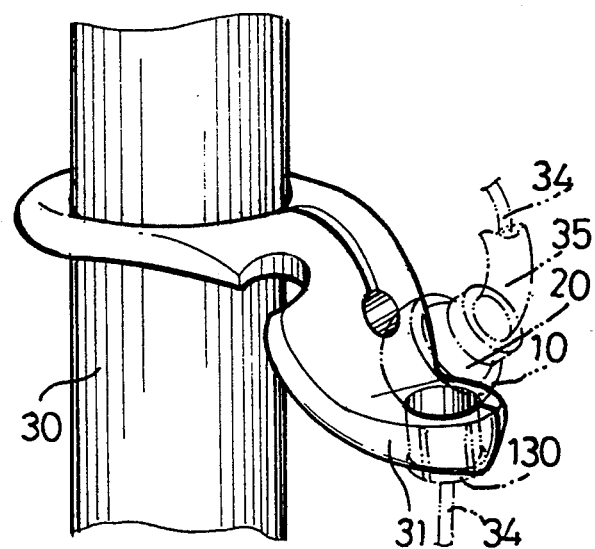
FIG. 5 illustrates the nipple of the present invention fixed on a bracket which is further fixed on a head tube of a bicycle.

FIG. 5 illustrates the rotatable nipple of the present invention fixed in the conventional bracket 31 (similar to the bracket 31 in FIG. 6), with the flange portions 130 of the first tube 13 abutting against a bottom portion of the bracket 31 preventing the nipple from being pulled out from the hole 32 thereof. It is noted that the flexible plates 140 can be depressed temporarily thus allowing the first tube 13 to be positioned into the hole 32 of the bracket 31.

While the present invention has been explained in relation to its preferred embodiment, it is to be understood that various modifications thereof will be apparent to those skilled in the art upon reading this specification. Therefore, it is to be understood that the invention disclosed herein is intended to cover all such modifications as fall within the scope of the appended claims.

I claim:

1. A universally rotatable nipple for a brake cable and comprising:

a socket means having a hemispherical body which defines a hemispherical cavity therein and a first tube extending from a peripheral portion of said hemispherical body, said first tube being in communication with said hemispherical cavity via a first hole and having a plurality of slots defined in the periphery of said first tube from a distal end portion thereof to nearly the periphery of said hemispherical body, thereby defining a plurality of flexible plates; and a rotatable means including a sphere and a second tube extending from a peripheral portion of said sphere, said second tube defining a first passage therein which further extends inward to a center of said sphere, said sphere including a second passage internally defined therein which is in communication with said first passage, said first passage having a diameter greater than that of said second passage, said first passage and said second passage intersecting at an obtuse angle along respective longitudinal directions thereof;

whereby, said sphere is rotatably received in said hemispherical cavity of said hemispherical body of said socket means with said second tube being in communication with said first tube thereby allowing a brake cable to be guided from said second tube through said first tube.

2. The universally rotatable nipple as claimed in claim 1 wherein said first tube has a plurality of flanges each respectively formed on a corresponding distal end of said flexible plate.

* * * * *